United States Patent
Nieuwlands (10) Patent No.: US 9,526,149 B2
(45) Date of Patent: Dec. 20, 2016

(54) OBJECT-SENSING LIGHTING NETWORK AND CONTROL SYSTEM THEREFOR

(75) Inventor: Erik Nieuwlands, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 732 days.

(21) Appl. No.: 13/503,392

(22) PCT Filed: Oct. 20, 2010

(86) PCT No.: PCT/IB2010/054759
§ 371 (c)(1),
(2), (4) Date: Apr. 23, 2012

(87) PCT Pub. No.: WO2011/055259
PCT Pub. Date: May 12, 2011

(65) Prior Publication Data
US 2012/0206051 A1    Aug. 16, 2012

Related U.S. Application Data (60) Provisional application No. 61/257,554, filed on Nov. 3, 2009.

(51) Int. Cl.
*H05B 37/02* (2006.01)

(52) U.S. Cl.
CPC ...... *H05B 37/0227* (2013.01); *H05B 37/0272* (2013.01); *Y02B 20/48* (2013.01)

(58) Field of Classification Search
CPC . H05B 37/02; H05B 37/0227; H05B 37/0272; H05B 33/0803; H05B 37/0245; H05B 33/0815; G06F 15/00
USPC ........ 315/153, 318, 363, 297, 294; 702/176
See application file for complete search history.

(56) References Cited

U.S. PATENT DOCUMENTS

| | | | |
|---|---|---|---|
| 4,758,959 A | 7/1988 | Thoone et al. | |
| 6,016,038 A | 1/2000 | Mueller et al. | |
| 6,211,626 B1* | 4/2001 | Lys | A61N 5/0616 315/291 |
| 6,548,967 B1* | 4/2003 | Dowling | G06Q 30/0201 315/307 |
| 7,495,671 B2 | 2/2009 | Chemel et al. | |
| 2004/0105264 A1* | 6/2004 | Spero | B60Q 1/04 362/276 |
| 2005/0218843 A1* | 10/2005 | Chen et al. | 318/254 |
| 2009/0009089 A1 | 1/2009 | Burkett | |

FOREIGN PATENT DOCUMENTS

| CN | 101267703 A | 9/2008 |
|---|---|---|
| EP | 1596639 A1 | 11/2005 |
| JP | 06052701 A | 2/1994 |
| JP | 2001307895 A | 2/2001 |
| JP | 2009054496 A | 3/2009 |

(Continued)

*Primary Examiner* — Douglas W Owens
*Assistant Examiner* — Wei Chan
(74) *Attorney, Agent, or Firm* — Meenakshy Chakravorty (57) ABSTRACT

Disclosed herein is an object—sensing lighting network and an intelligent control system therefore. The control system dynamically determines the at least one lighting fixture's relationship to a plurality of other lighting fixtures. The light output level of a light source of the at least one lighting fixture is based at least partially on the at least one lighting fixture's relationship to the other lighting fixtures.

20 Claims, 3 Drawing Sheets

(56) References Cited

FOREIGN PATENT DOCUMENTS

| WO | 2006095316 | A1 | 9/2006 | |
|---|---|---|---|---|
| WO | 2007102114 | A1 | 9/2007 | |
| WO | 2007126662 | A2 | 11/2007 | |
| WO | 2008129488 | A2 | 10/2008 | |
| WO | 2009003279 | A1 | 1/2009 | |
| WO | WO2009/003279 | * | 1/2009 | ............ H05B 37/02 |
| WO | 2010100586 | A2 | 9/2010 | |

* cited by examiner

OBJECT-SENSING LIGHTING NETWORK AND CONTROL SYSTEM THEREFOR

TECHNICAL FIELD

The present invention is directed generally to control of lighting fixtures employing solid-state light sources. More particularly, various inventive methods and apparatus disclosed herein relate to an intelligent control system for an object-sensing network.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626. These fixtures can also be configured to integrate illumination with data manipulation and transmission functions, for example, as discussed in U.S. Pat. No. 6,548,967, incorporated herein by reference.

Many lighting fixtures have been designed that implement LEDs in order to achieve energy savings. Lighting fixtures have also been designed that additionally or alternatively implement intelligent lighting control system in order to achieve energy savings. For example, some street lighting fixtures include a daylight sensor and a motion detector and are wirelessly linked with other in-range street lighting fixtures. Each street lighting fixture only illuminates when the ambient light level as measured by the daylight sensor thereof is below a certain level and either (1) motion has been detected or (2) a wireless signal from a neighboring street lighting fixture indicates motion has been detected by the motion detector of the neighboring street lighting fixture. When an object is detected by the motion detector of the neighboring street lighting fixture the wireless signal it sends out causes all street lighting fixtures that are in-range of the neighboring street lighting fixture to be illuminated. Thus, the same number of neighboring street lighting fixtures will be illuminated regardless of the actual path of the detected object. In the case of a road with a median having street lighting fixtures on each side of the median, this may cause certain in-range street lighting fixtures on a side of the median opposite the object to be unnecessarily illuminated. In the case of a curvy road, this may cause certain street lighting fixtures that are a short time of flight distance away from an object, but a long distance away along the actual path of the object, to be unnecessarily illuminated. The relationship between lighting fixtures in such systems is based on distance therebetween and is not dynamically determined by, for example, their relationship to one another along one or more normal paths of activity.

Thus, there is a need in the art for an intelligent control system for an object-sensing network, which includes one or more lighting fixtures capable of dynamically determining a relationship to a plurality of other lighting fixtures.

SUMMARY

The present disclosure is directed to inventive methods and apparatus for an intelligent control system for an object-sensing lighting network, and, more specifically, for a control system for an outdoor lighting fixture that dynamically determines a relationship to a plurality of other lighting fixtures. For example, the control system of a lighting fixture may dynamically determine its relationship to a plurality of other lighting fixtures along one or more normal paths of activity by monitoring travel times of an object between the lighting fixture and a plurality of other lighting fixtures during periods of low activity.

Generally, in one aspect, a dynamic street lighting fixture network includes a plurality of street lighting fixture nodes in network communication with one another. Each of the street lighting fixture nodes includes at least one street lighting fixture having at least one light source, for example, one or more LEDs, a controller in communication with the light source, an object detection system, such as a motion detection system, in electrical communication with the controller, a data transmission system in electrical communication with the controller, and a data reception system in electrical communication with the controller. The motion detection system of each of the street lighting fixture nodes is operable to detect movement within a coverage range and communicate detection of the object to the controller. The data transmission system transmits street lighting fixture identification data when the object is sensed by the motion detection system. The data reception system of each of the street lighting fixture nodes is operable to receive the street lighting fixture node identification data from other of the street lighting fixture nodes and communicate the street lighting fixture identification node data to the controller. During periods of low activity, the controller of each of the street lighting fixture nodes is operable to dynamically determine a temporal relationship to each of a plurality of the street lighting fixture nodes. Each temporal relationship is based on analysis of a plurality of time differences, each of the time differences related to the difference in time between recent object detection by the motion detector and a recent receipt of the street lighting fixture identification data from one of the street lighting fixtures.

In some embodiments, each temporal relationship is determined by averaging a plurality of the time differences for each of a plurality of the street lighting fixture nodes to create a time difference average for each of a plurality of the street lighting fixture nodes. In some versions of these embodiments the controller of each of the street lighting fixture nodes may be operable to cause at least one light source thereof to output at least a first level of light output when the street lighting fixture node identification data received by the data reception system thereof is indicative of at least one of the street lighting fixture nodes having at least a first temporal relationship. In some versions of these embodiments, the controller of each of the street lighting fixture nodes may be operable to cause at least one light source thereof to output a second level of light output greater than the first level of light output when the street lighting fixture node identification data received by the data reception system thereof is indicative of at least one of the street lighting fixture nodes having a second temporal relationship smaller than the first temporal relationship. The first level of light output and the second level of light output may be derived from, for example, a look up table and/or a formula.

In some embodiments, the controller of each of the street lighting fixture nodes may be further operable to dynamically determine a spatial relationship to each of a plurality of the street lighting fixture nodes.

Generally, in another aspect, a control system for at least one lighting fixture includes a controller including a light source communication output, a motion detector in electrical communication with the controller, a data transmitter in electrical communication with the controller, and a data receiver in electrical communication with the controller. The motion detector is operable to detect an object within a lighting fixture coverage range. The data receiver is operable to receive lighting fixture identification data from at least one of a plurality of lighting fixtures, the lighting fixture identification data indicative of object detection by a specific of the lighting fixtures. The controller is operable to be initially dynamically calibrated during periods of low activity. The controller is calibrated by dynamically determining a temporal relationship to each of a plurality of the lighting fixtures through analysis of a plurality of time differences for each of the lighting fixtures. Each of the time differences is related to the difference in time between recent object detection by the motion detector and a recent receipt of the lighting fixture identification data from one of the lighting fixtures. After the controller is calibrated, the controller is operable to selectively alter an output signal over the light source communication output based on the temporal relationship to one of the lighting fixtures corresponding to at least one recently received lighting fixture identification data.

In some embodiments, the output signal may be dependent on a formula having the temporal relationship to one of the lighting fixtures as a variable. The output signal may be dependent on a lookup table having a plurality of the temporal relationship as values.

In some embodiments, before the controller is calibrated, the controller does not selectively alter the output signal.

In some embodiments, the controller may be further operable to dynamically determine a spatial relationship to each of a plurality of the lighting fixtures. In some versions of these embodiments, the spatial relationship may be determined through analysis of at least one of successor lighting fixture identification data to object detection by the motion detector and predecessor lighting fixture identification data to object detection by the motion detector. In some versions of these embodiments the spatial relationship may be determined through analysis of the successor lighting fixture identification to object detection by the motion detector and the predecessor lighting fixture identification to object detection by the motion detector. In some versions of these embodiments the spatial relationship may be determined through analysis of differences between the temporal relationships of a plurality of the lighting fixtures. In some versions of these embodiments the controller may be operable to selectively alter the output signal over the light source communication output based on the spatial relationship to at least two of the lighting fixtures corresponding to recently received lighting fixture identification data.

Generally, in another aspect, a lighting fixture having a control system for communicating with a plurality of lighting fixtures in a lighting fixture network includes at least one light source, a controller in electrical communication with the light source, a motion detector in electrical communication with the controller, a data transmitter in electrical communication with the controller, and a data receiver in electrical communication with the controller. The motion detector is operable to detect an object within a lighting fixture coverage range. The data receiver is operable to receive lighting fixture identification data from a plurality of lighting fixtures, each lighting fixture identification data indicative of object detection by a specific of the lighting fixtures. The controller is dynamically calibrated by determining a temporal and spatial relationship to each of a plurality of the lighting fixtures through analysis of a plurality of time differences for each of the lighting fixtures. Each of the time differences is related to the difference in time between recent object detection by the motion detector and a recent receipt of the lighting fixture identification data from one of the lighting fixtures. After the controller is calibrated, the controller is operable to ensure the light source produces a first level of light output when a recently received lighting fixture identification data is indicative of one of the lighting fixtures whose the temporal relationship is within a first time period and when the recently received lighting fixture identification data and at least one lighting fixture identification data preceding the recently received lighting fixture identification data is indicative of a spatial relationship that is decreasing.

In some embodiments, after the controller is calibrated, the controller may be operable to ensure the light source produces a second level of light output greater than the first level of light output when the one recently received lighting fixture identification data is indicative of one of the lighting fixtures whose the temporal relationship is within a second time period less than the first time period, and when the recently received lighting fixture identification data and at least one lighting fixture identification data preceding the recently received lighting fixture identification data is indicative of a spatial relationship that is decreasing.

In some embodiments, after the controller is calibrated, the controller may be operable to decrease the level of light output of the light source when the recently received lighting fixture identification data and at least one lighting fixture identification data preceding the recently received lighting fixture identification data is indicative of a spatial relationship that is increasing.

In some embodiments, before the controller is calibrated, the controller may be operable to ensure the light source produces a default level of light output when the ambient light level proximal the lighting fixture is below a threshold value.

Generally, in another aspect, a method of calibrating a lighting fixture within a lighting fixture network comprises monitoring a lighting fixture network for a period of low activity. The method further comprises receiving a plurality of lighting fixture identification data during the period of low activity, each lighting fixture identification data indicative of object detection proximal one of a plurality of lighting fixtures. The method further comprises detecting an object within a reference lighting fixture coverage range during the period of low activity. The method further comprises calculating a plurality of time differences for each of the lighting fixtures. Each of the time differences is related to the difference in time between a recent object detection within the lighting fixture coverage range and a recent receipt of the lighting fixture identification data from a single of the lighting fixtures. The method further comprises calculating a temporal relationship to each of the lighting fixtures. The temporal relationship to each of the lighting fixtures is related to a plurality of the time differences.

In some embodiments, the method further comprises the step of determining a spatial relationship to each of a plurality of the lighting fixtures.

In some embodiments, the spatial relationship may be determined through analysis of at least one of successor lighting fixture identification data received after detecting movement with the lighting fixture coverage range and predecessor lighting fixture identification data received prior to detecting movement with the lighting fixture coverage range. In some versions of these embodiments the spatial relationship may be determined through analysis of the successor lighting fixture identification data received after object detection within the lighting fixture coverage range and the predecessor lighting fixture identification data received prior to object detection within the lighting fixture coverage range. In some versions of these embodiments the spatial relationship may be determined through analyzing differences between the temporal relationships of a plurality of the lighting fixtures.

Generally, in another aspect, a method of controlling a lighting fixture within a lighting fixture network comprises monitoring a lighting fixture network for a period of low activity. The method further comprises receiving a plurality of lighting fixture identification data during the period of low activity, each lighting fixture identification data indicative of object detection proximal one of a plurality of lighting fixtures. The method further comprises detecting an object within a reference lighting fixture coverage range during the period of low activity. The method further comprises calculating a plurality of time differences for each of the lighting fixtures. Each of the time differences is related to the difference in time between a recent object detection within the reference lighting fixture coverage range and a recent receipt of the lighting fixture identification data. The method further comprises calculating a temporal relationship to each of the lighting fixtures. The temporal relationship to each of the lighting fixtures is related to a plurality of the time differences. The method further comprises causing at least one light source proximal the reference lighting fixture coverage range to be powered with power having predetermined characteristics. The predetermined characteristics are dependent on the temporal relationship of a lighting fixture corresponding to a recently received lighting fixture identification data.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization. For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Lighting fixtures have been designed that implement an intelligent lighting control system in order to achieve energy savings. When an object is detected by a motion detector of a lighting fixture implementing such an intelligent lighting control system, the lighting fixture sends out a signal that causes all street lighting fixtures that are in-range thereof to be illuminated. The relationship between lighting fixtures in such systems is based on distance therebetween and is not dynamically determined by, for example, their relationship to one another along one or more normal paths of activity.

As a result, when an object is detected in such a system, some lighting fixtures thereof may be operated at a high level of light output unnecessarily, unnecessarily early, and/or may be maintained at a high level of light output for an unnecessarily long time. Thus, Applicants have recognized and appreciated that it would be beneficial to provide an intelligent control system for a motion-sensing lighting network including one or more lighting fixture that dynamically determines the lighting fixture's relationship to a plurality of other lighting fixtures so that the lighting fixture may be more efficiently operated when an object is detected by the lighting fixture and/or one or more other lighting fixtures. Such an object may be, for example, a car, truck, bus, bicycle, train, or a pedestrian.

More generally, Applicants have recognized and appreciated that it would be beneficial to provide a control system for a networked lighting fixture that dynamically determines the lighting fixture's relationship to a plurality of other lighting fixtures.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the approach disclosed herein are particularly suited for an intelligent control system for a motion-sensing street lighting network disposed along a roadway and configured to provide a predetermined light output level based on traffic conditions on the roadway. Accordingly, for illustrative purposes, the claimed invention is discussed in conjunction with such street lighting network. However, other configurations and applications of this approach are contemplated without deviating from the scope or spirit of the claimed invention.

Figure 1:
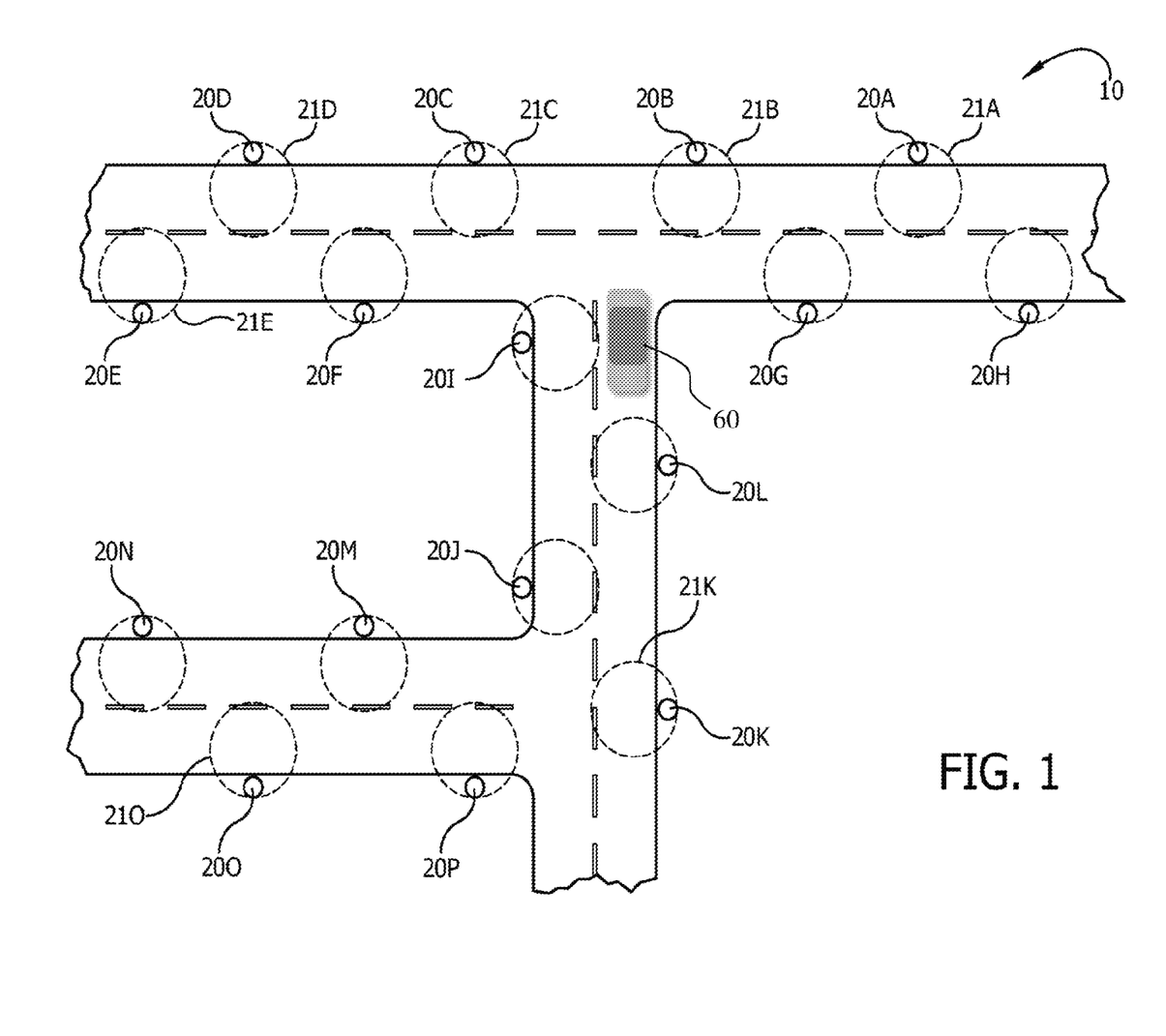
FIG. 1 illustrates an embodiment of a street lighting fixture network having a plurality of street lighting fixtures disposed along a roadway.

Referring to FIG. 1, a street lighting fixture network 10 includes a plurality of street lighting fixtures 20A-P disposed along a roadway. Each of the street lighting fixtures 20A-P has a corresponding street lighting fixture coverage range 21A-P within which it may detect motion of an object 60 such as, for example, a vehicle. The plurality of street lighting fixtures 20A-P are in network communication with one another.

Figure 2:
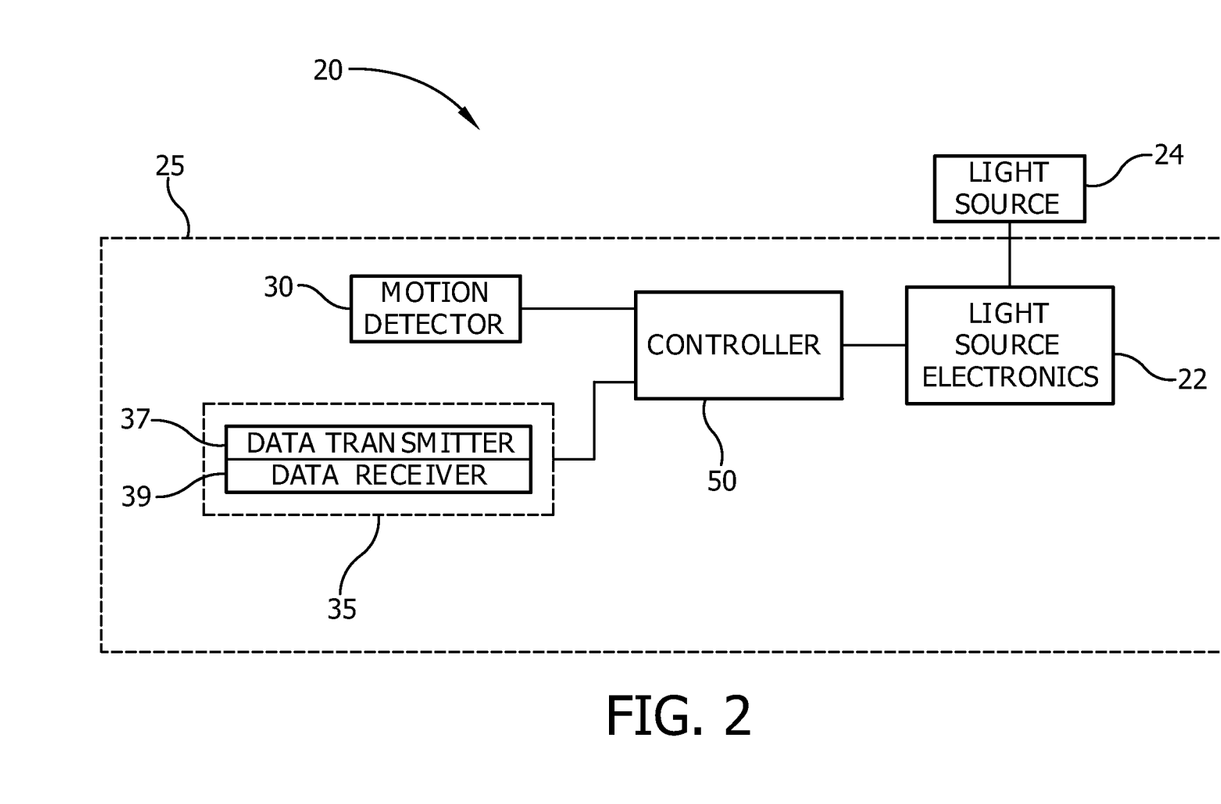
FIG. 2 illustrates a schematic diagram of one of the street lighting fixtures of FIG. 1.

Referring to FIG. 2, a schematic diagram of a control system 25 common to each of the street lighting fixtures 20A-P of the street lighting fixture network 10 is depicted. The "A-P" designation has been omitted from the various components illustrated in FIG. 2, since the components are common to each of the street lighting fixtures 20A-P, but may be used herein with an "A-P" designation to refer to a specific of the street lighting fixtures 20A-P. The control system 25 and the light source 24 may be in electrical communication with a power source such as, for example, an external AC power source.

In some embodiments, the control system 25 may include a daylight sensor in electrical communication with an external AC power source and a switch, and the switch may be in electrical communication with the daylight sensor, the external AC power source, and the control system 25. The daylight sensor may be operably positioned to measure the ambient light level. When the ambient light level measured by the daylight sensor falls below a predetermined level it may cause the switch to route power from the external AC power source to the control system 25 thereby only powering the control system 25 during times of low ambient light. In some embodiments an AC to DC converter may be interposed between an external AC power source and the control system 25.

An object detector 30 and a data transceiver 35 are in electrical communication with a controller 50. The controller 50 is in electrical communication with light source electronics 22 that power a light source 24. In some embodiments, the light source 22 is an LED light source and the light source electronics 22 include one or more drivers for powering the light source 22 at a desired light output level. In other embodiments, the light source 22 is an HID light source and the light source electronics 22 include one or more ballasts for powering the light source 22 at a desired light output level. Other types of light sources can also be employed without deviating from the scope and spirit of the invention.

The controller 50 is operable to communicate with the light source electronics 22 to ensure the light source 24 is being appropriately powered. For example, in some embodiments, such as the embodiment of FIG. 2, the controller 50 may communicate with the light source electronics 22 to ensure the light source 24 is producing a desired intensity of light output. For example, the light source electronics 22 may modulate the power being provided to the light source 24 to control the illumination intensity thereof based on input received from controller 50. The light output of the light source 24 may be altered through, for example, pulse width modulation by the light source electronics 22 to cause the light source 24 to produce light output having a desired intensity.

The data transceiver 35 includes a data transmitter 37 and a data receiver 39. In some embodiments the data transmitter 37 may include a radio-frequency (RF) transmitter and the data receiver 39 may include a RF receiver. In some embodiments the data transmitter 37 and the data receiver 39 may be separable parts from one another and not included in a data transceiver 40 package. The data transmitter 37 cooperates with the controller 50 to form a data transmission system that transmits data to at least one other of street lighting fixtures 20A-P and the data receiver 39 cooperates with the controller 50 to form a data reception system that receives data from at least one other of street lighting fixtures 20A-P. In alternative embodiments data may be communicated between the various street lighting fixtures 20A-P over any physical medium, including, for example, twisted pair coaxial cables, fiber optics, or a wireless link using, for example, infrared, microwave, or encoded visible light transmissions and any suitable transmitters, receivers or transceivers may be used to effectuate communication in the lighting fixture network 10. Any suitable protocol may be used for data transmission, including, for example, TCP/IP, variations of Ethernet, Universal Serial Bus, Bluetooth, FireWire, Zigbee, DMX, 802.11b, 802.11a, 802.11g, token ring, a token bus, serial bus, power line networking over mains or low voltage power lines, or any other suitable wireless or wired protocol. The lighting fixture network 10 may also use combinations of physical media and/or data protocols.

In some embodiments, the light source electronics 22 include an LED driver and the light source 24 includes an LED light source employing a data transmitter used to transmit data to other of the street lighting fixtures 20A-P. In some of these embodiments, the output of the LED light source may be altered through, for example, pulse code modulation and/or pulse position modulation by the LED driver to cause the LED light source to produce light output having encoded LED data. An optical sensor may include a data receiver and be operably positioned on each of the street lighting fixtures 20A-P to receive light output having encoded LED data from at least one of street lighting fixtures 20A-P. The optical sensor may be in communication with the controller 50 to interpret the received light output having encoded LED data. The optical sensor may be, for example, a phototransistor, photodiode, or any other device capable of detecting incident light having the wavelength present in a received of light output having encoded LED data.

The object detector 30 can be implemented as a motion detector operably positioned to detect presence and/or motion of an object within a coverage range. In some embodiments, the object detector 30 may be, for example, one or more devices that detect motion and/or presence of an object through, for example, infrared light, laser technology, radio waves, a fixed camera, inductive proximity detection, a thermographic camera, and/or an electromagnetic or electrostatic field. The object detector 30 and the controller 50 comprise a motion detection system in the embodiment of FIG. 2.

When motion is detected by the object detector 30 of a particular street lighting fixture 20A-P, the controller 50 thereof may cause data to be transmitted via data transmitter 37 thereof. The transmitted data includes lighting fixture identification data that is indicative of movement being detected by that particular transmitting street lighting fixture 20A-P. The data receiver 39 of at least one other street lighting fixture 20A-P is operable to receive the street lighting identification data. If the at least one other street lighting fixture 20A-P has been calibrated, it will ensure the light output of the light source 24 is at an appropriate light output level based on its dynamically determined temporal relationship to the transmitting street lighting fixture 20A-P, as described in additional detail herein. If the at least one other street lighting fixture 20A-P has not been calibrated, the controller 50 thereof may determine a time difference related to the transmitting street lighting fixture 20A-P, as described in additional detail herein. The time difference may be used to calculate a temporal relationship and is related to the difference in time between receipt of the street lighting identification data from the transmitting street lighting fixture 20A-P and a detection of movement by the at least one other street lighting fixture 20A-P.

Referring again to FIG. 1, calibration of a single street lighting fixture 20M of the street lighting fixture network 10 according to one embodiment is described in detail. The street lighting fixture 20M may calibrate itself during one or more period of low activity. A period of low activity corresponds to times when relatively few cars are present proximal lighting fixture 20M such that the amount of time it takes for a single vehicle to travel between some of street lighting fixtures 20A-L, and 20N-P and street lighting fixture 20M may be determined. In some embodiments the period of low activity may be determined based on the amount of detected motion on all or portions of the street lighting fixture network 10. In some embodiments the periods of low activity may be a preselected time period such as, for example 3:00 A.M.-4:00 A.M. In other embodiments the period of low activity may be otherwise determined.

During the period of low activity the street lighting fixture 20M may receive, via data receiver 39M thereof, a plurality of lighting fixture identification data each being indicative of a movement being detected by one of the lighting fixtures 20A-L and 20N-P. The controller 50M of street lighting fixture 20M calculates a plurality of time differences, each of the time differences being related to the time between receipt of the lighting fixture identification data for a single of lighting fixtures 20A-L and 20N-P and detection of movement by the motion detector 30M of the street lighting fixture 20M. Each of the time differences is indicative of the amount of time it took for an object to travel between a single of street lighting fixture coverage ranges 21A-L and 21N-P and street lighting fixture coverage range 21M.

After a predetermined number of time differences have been calculated the controller 50M may then calculate a temporal relationship to each of a plurality of the lighting fixtures 20A-L and 20N-P, based on a plurality of calculated time differences for each of the lighting fixtures 20A-L and 20N-P. In some embodiments the temporal relationship for a single fixture of the lighting fixtures 20A-L and 20N-P may be based on, for example, taking an average of all the time differences for the single fixture. In some embodiments the temporal relationship for a single fixture of the lighting fixtures 20A-L and 20N-P may be based on, for example, taking an average of a statistically significant range of time differences for the single fixture. In some embodiments the temporal relationship for a single fixture of the lighting fixtures 20A-L and 20N-P may be based on, for example, a mean value of all non-outlier time differences for the single fixture. In other embodiments the temporal relationship for a single fixture of the lighting fixtures 20A-L and 20N-P may be otherwise based on a plurality of the time differences for the single fixture.

As an example, Table 1-1 below shows a plurality of example measured time differences for street lighting fixture 20M with respect to street lighting fixture 20A. Each time difference is indicative of the amount of time, in seconds, it took for an object to travel from street lighting fixture coverage range 21A to street lighting fixture coverage range 21M. The ">180" value are indicative of a time greater than 180 seconds and may be indicative of, for example, a vehicle that never passed by street lighting fixture 20M after passing by street lighting fixture 20A.

TABLE 1-1

| Street Lighting Fixture 20M Data for 20A | | | | | | | | | | | | |
|---|---|---|---|---|---|---|---|---|---|---|---|---|
| Δt (s) | 20 | 42 | 46 | 50 | >180 | >180 | >180 | 44 | 39 | 45 | 41 | 48 | 49 |

In some embodiments, in order to determine the temporal relationship of street lighting fixture 20M to street lighting fixture 20A, controller 50M may calculate an average of the lowest statistically significant range of time differences. For example, the controller 50M may calculate an average of all measured time differences from 40 seconds to 49 seconds, resulting in a calculated temporal relationship of 45 seconds to street lighting 20A. The temporal relationship to a given street lighting fixture 20A-L or 20N-P may be fixed after a predetermined number of time differences have been received for that given fixture. In other embodiments the temporal relationship to a given street lighting fixture 20A-L or 20N-P may be continuously updated during periods of low activity. In some embodiments the temporal relationship to a given street lighting fixture 20A-L or 20N-P may be resettable, for example, manually and/or if controller 50M recognizes a significant change in calculated time difference with respect to a given street lighting fixture 20A-L or 20N-P. A significant change in calculated time difference may occur if, for example, traffic patterns are altered and/or the speed limit is altered.

As an additional example, Table 1-2 below shows calculated temporal relationships for street lighting fixture 20M with respect to street lighting fixture 20A-L and 20N-P.

TABLE 1-2

Temporal Relationship Data for Street Lighting Fixture 20M

| Pole | | | | | | | |
|---|---|---|---|---|---|---|---|
| 20A | 20B | 20C | 20D | 20E | 20F | 20G | 20H |
| Δt (s) 40 | 35 | >180 | >180 | 45 | 40 | >180 | >180 |

| Pole | | | | | | |
|---|---|---|---|---|---|---|
| 20I | 20J | 20K | 20L | 20N | 20O | 20P |
| Δt (s) 20 | 15 | 25 | >180 | >180 | >180 | >180 |

Controller 50M may adjust the light output of light source 24M based on the calculated temporal relationship to a street lighting fixture 20A-L or 20N-P corresponding to a recently received of street lighting fixture identification data. As an example, controller 50M may adjust the light source 24M thereof in accordance with Table 1-3 below, which shows various light outputs that correspond to various temporal relationships. In alternative embodiments the controller 50M may adjust the light source thereof in accordance with, for example, another table and/or with a formula that includes the temporal relationship as a variable thereof.

TABLE 1-3

Light Output Level for Street Lighting Fixture 20M

| Δt | | | |
|---|---|---|---|
| 0 < Δt < 30 | 29 < Δt < 60 | 59 < Δt < 180 | Δt > 179 |
| Output 100% | 85% | 70% | 30% |

Continuing reference is made to FIG. 1 for an example of the behavior of street lighting fixture 20M after calibration, utilizing Table 1-2 and Table 1-3. If a vehicle moves within the street lighting fixture coverage range 21A, the data transmitter 37A of street lighting fixture 20A transmits, either directly or indirectly, street lighting identification data to street lighting fixture 20M, which receives the street lighting fixture identification data via data receiver 39M. Since the calculated temporal relationship of street lighting fixture 20M to street lighting fixture 20A is less than 60 seconds but greater than 29 seconds (45 seconds), controller 50M causes light source 24M to be illuminated to produce approximately 85% of its light output. If the vehicle moves within the street lighting fixture coverage range 21B, data transmitter 37B transmits street lighting fixture identification data, either directly or indirectly, to data receiver 39M. Since the calculated temporal relationship of street lighting fixture 20M to street lighting fixture 20B is less than 60 seconds but greater than 29 seconds (35 seconds), controller 50M maintains the light source 24M at approximately 85% of its light output.

If the vehicle were to continue on a straight path and move within the street lighting fixture coverage range 21C, data transmitter 37C would transmit street lighting fixture identification data, either directly or indirectly, to data receiver 39M. Since the calculated temporal relationship of street lighting fixture 20C to street lighting fixture 20M is greater than 180 seconds, controller 50M would reduce the light output of the light source 24M to approximately 30% of its light output. If the vehicle were to instead turn left and move within the street lighting fixture coverage range 21I, data transmitter 37I would transmit street lighting fixture identification data to data receiver 39M. Since the calculated temporal relationship of street lighting fixture 20I to street lighting fixture 20M is less than 30 seconds (20 seconds), controller 50M would increase the light output of the light source 24M to approximately 100% of its light output. In some embodiments the light output of light source 24M may be maintained at approximately 100% until the vehicle approached another street lighting fixture having a temporal value corresponding to a lower light output value (e.g. street lighting fixture 20N) and/or until a predetermined amount of time has elapsed without receiving street lighting fixture identification data indicative of a proximal vehicle.

In some embodiments, a newly installed of street lighting fixtures 20A-P may be on at full light output until it has received enough statistical data from other of street lighting fixtures 20A-P to be calibrated. In some embodiments one or more of the street lighting fixtures 20A-P may be configured with a minimum light output level. For example, a plurality of the street lighting fixtures 20A-P may be configured to produce at least a 70% light output level at all times in order to maintain a safe environment. In some embodiments one or more of the light sources 24A-P of the street lighting fixtures 20A-P may be turned completely off after, for example, a predetermined amount of time has elapsed without receiving a street lighting fixture identification data indicative of a proximal vehicle and/or after street light identification data has been received indicative of an object moving away from the street lighting fixtures 20A-P.

In some embodiments, the light output level of one or more of the street lighting fixtures 20A-P may additionally or alternatively be dependent on determination of direction of a detected object. In some embodiments the direction of a detected object with respect to a reference fixture may be determined by comparing the temporal relationship corresponding to a recently received street lighting fixture identification data to the temporal relationship corresponding to a less recently received street lighting fixture identification data. For example, an increasing temporal relationship may indicate an object is moving away from the reference fixture.

In some embodiments, the direction of a detected object may be determined with reference to a calculated spatial relationship between the street lighting fixtures 20A-P. The spatial relationship may be calibrated and determined during periods of low activity and may include calculating one or more paths based on successor activity of light fixture identification data. For example, during periods of low activity sequential street lighting fixture identification data may be monitored to determine the following eight typical paths of activity along street lighting network 10 shown below in Table 1-4.

TABLE 1-4

Paths of Activity for Street Lighting Network 10

| Path 1 | 20A | 20B | 20C | 20D | | |
|---|---|---|---|---|---|---|
| Path 2 | 20E | 20F | 20G | 20H | | |
| Path 3 | 20A | 20B | 20I | 20J | | |
| Path 4 | 20K | 20L | 20G | 20H | | |
| Path 5 | 20A | 20B | 20I | 20J | 20M | 20N |

TABLE 1-4-continued

Paths of Activity for Street Lighting Network 10

| Path 6 | 20O | 20P | 20K | 20L | 20G | 20H |
| Path 7 | 20E | 20F | 20I | 20J | 20M | 20N |
| Path 8 | 20O | 20P | 20K | 20L | 20C | 20D |

During periods of low activity after the spatial relationships have been determined, only certain of street lighting fixtures 20A-P may be illuminated when motion is detected at a given of the street lighting fixtures 20A-P based on the spatial relationship. For example, if motion is detected in street lighting fixture coverage range 21A, the street lighting fixtures along Paths 1, 3, and 5 (20A, 20B, 20C, 20D, 20I, 20J, 20M, and 20N) may be illuminated. In some embodiments those closer to street lighting fixture 20A along the paths may be illuminated to a higher light output level than those farther along the paths. For example, street lighting fixtures 20B, 20C, and 20I may be illuminated to a higher light output level than street lighting fixtures 20D and 20J, and street lighting fixtures 20D and 20J may be illuminated to a higher light output level than street lighting fixtures 20M and 20N. If motion is then detected in street lighting fixture coverage range 21B, the light output level of street lighting fixtures 20D and 20J may be increased. If motion is then detected in street lighting fixture coverage range 21C, the light output of street lighting fixtures 20I, 20J, 20M, and 20N may be decreased since at that point it can be determined that movement is occurring along Path 1 and not along either of Path 3 or Path 5.

The light output of a given of street lighting fixtures 20A-P may be dependent on solely the determined spatial relationship among the street lighting fixtures 20A-P. In some embodiments the light output of a given of street lighting fixtures 20A-P may be dependent on the determined spatial relationship among the street lighting fixtures 20A-P and the determined temporal relationship therebetween. In some embodiments the light output of a given of street lighting fixtures 20A-P may be dependent on the determined spatial relationship among the street lighting fixtures 20A-P and the time of flight therebetween.

The light output level of one or more street lighting fixtures 20A-P may also be dependent on the ambient light level as measured by a daylight sensor. For example, if the ambient light level is indicative of relatively dark conditions a given of street lighting fixtures 20 A-D may be illuminated to a higher level of light output for a given temporal relationship than if the ambient light level is indicative of relatively light night time conditions (as may be the case with snow cover and/or a full moon).

It will be appreciated that utilizing the temporal and/or spatial dynamic calibration described herein, replacement of a single of street lighting fixtures 20A-P may occur without the need to alter any settings of the non-replaced street lighting fixture 20A-P and the replaced of street lighting fixtures 20A-P will readily adapt and self-calibrate within the street lighting fixture network 10. Additionally, new installations of a street lighting network 10 may occur without the necessity for commissioning. For example, new installations may occur without the need for manual calibration of the individual street lighting fixtures 10 and without the need to manually map the individual street lighting fixtures 20A-P.

Figure 3:
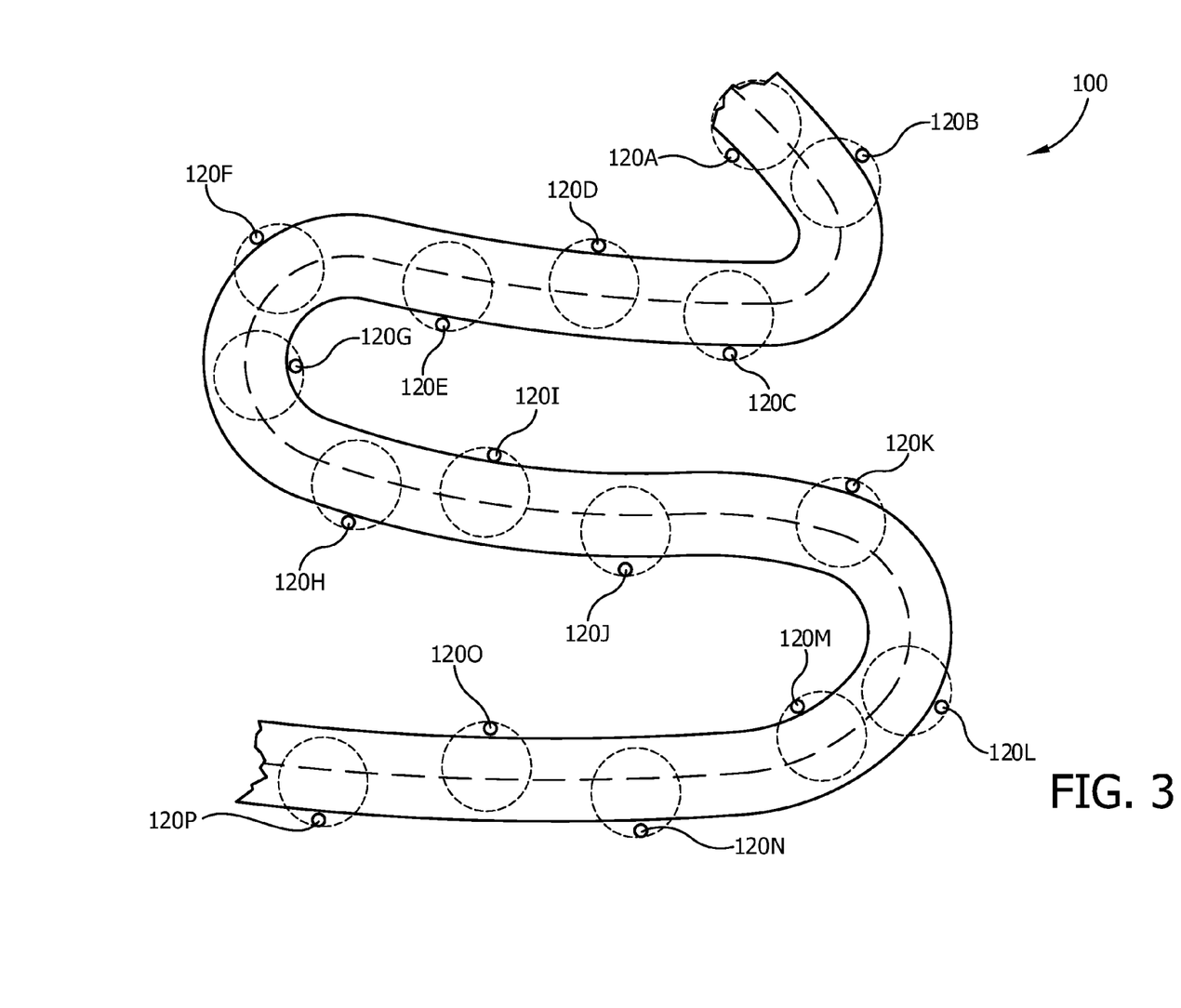
FIG. 3 illustrates another embodiment of a street lighting fixture network having a plurality of street lighting fixtures disposed along a curvy roadway.

Referring to FIG. 3, in another embodiment, a street lighting fixture network 100 has a plurality of street lighting fixtures 120A-P disposed along a curvy roadway. The plurality of street lighting fixtures 120A-P are in network communication with one another and each is operable to detect movement of an object within a corresponding streetlight coverage range generally represented by a dashed annular line surrounding each of the street lighting fixtures 120A-P. The spatial relationship between the street lighting fixtures 120A-P may be determined during periods of low activity and may include calculating one or more paths based on successor activity. For example, during periods of low activity sequential street lighting fixture identification data may be monitored by each of the street lighting fixtures 120A-P, so that each street lighting fixture may determine its relationship among the other of the street lighting fixtures 120A-P. For example, table 3-1 below shows the spatial relationship of street lighting fixture 120K to other fixtures. The spatial relationship of table 3-1 is calculable by tracking the street lighting fixture identification data preceding and succeeding detection of motion by street lighting fixture 120K during periods of low activity.

TABLE 3-1

Spatial Relationship of Street Lighting Fixture 120K to other Fixtures

| | Fixture | | | | | | | | | | | | | | |
| --- | --- | --- | --- | --- | --- | --- | --- | --- | --- | --- | --- | --- | --- | --- | --- |
| | A | B | C | D | E | F | G | H | I | J | L | M | N | O | P |
| Distance | 10 | 9 | 8 | 7 | 6 | 5 | 4 | 3 | 2 | 1 | 1 | 2 | 3 | 4 | 5 |

A controller associated with street lighting fixture 120K can cause a light source thereof to illuminate to a light output level that corresponds to the spatial relationship between street lighting fixture 120K and at least one recently received street lighting fixture identification data. For example, in some embodiments street lighting fixture 120K may illuminate to a threshold illumination level if a most recently received street lighting fixture identification data is indicative of motion at a street lighting fixture 120A-P having a spatial relationship of three or less. Also, for example, in some embodiments, street lighting fixture 120K may illuminate to threshold illumination level if a most recently received street lighting fixture identification data is indicative of motion at a street lighting fixture 120A-P having a spatial relationship of three or less and if at least two recently received street lighting fixture identification data are indicative of motion that is moving in a direction toward street lighting fixture 120K. In some embodiments the light output of a given of street lighting fixtures 120A-P may be dependent on solely the determined spatial relationship among the street lighting fixtures 120A-P. In some embodiments the light output of a given of street lighting fixtures 120A-P may be dependent on the determined spatial relationship among the street lighting fixtures 120A-P and the determined temporal relationship therebetween. The light output of a given of street lighting fixtures 120A-P may be dependent on the determined spatial relationship among the street lighting fixtures 120A-P and the time of flight therebetween.

Although various embodiments of the control system for a luminaire have been described herein, many variations thereof and/or additions thereto may be implemented. For example, in some embodiments street lighting fixtures can be designed with independently-controlled bilateral luminous intensity distributions. In the case of, for example, sparsely-travelled roads, intersections, or roads that become relatively non-busy at night, it may be desirable to have only one side of the independently-controlled bilateral luminous intensity street lighting fixture illuminate at full intensity, thereby minimizing the glare perceived by a driver. Depending on the amount, direction, and/or speed of traffic proximal a street lighting fixture, one or both sides of the street lighting fixture may be lit accordingly.

Also, for example, in some embodiments solar-powered street lighting fixtures may be utilized. Also, for example, in regions without radio coverage, encoded light emissions could be used to transmit travel advisory information to suitably-equipped vehicles.

Also, for example, in some embodiments, one or more components of a single control system 25 may be associated with multiple lighting fixtures. For example, a single control system 25 may control a lighting fixture node having a plurality of lighting fixtures and may be in network communication with one or more lighting fixture nodes each having one or more lighting fixtures. In those or other embodiments the control system may be physically located with or adjacent a single of the plurality of lighting fixtures or may be, for example, provided on a remote pole or other area distinct from the plurality of lighting fixtures.

Also, for example, in some embodiments the lighting network may be used for interior applications, such as, for example, in corridors, tunnels, offices, stores (e.g. in shelving lighting), or transition spaces in airports. In these or other applications, the lighting network may be operable to detect various pedestrian movements. For example, the pedestrians may walk at different speeds, or may run, use roller blades, or may move at different speeds on a conveyor belt and be detected by the lighting network. A change in light output relative to a threshold light output refers to the overall light output intensity as well as a component of the light output intensity such as, for example, a particular wavelength.

Also, for example, in some embodiments, cameras may be integrated into the street lighting fixture network and configured to take pictures of a vehicle's license plate when the speed of the vehicle as measured by one or more street lighting fixtures is beyond the speed limit. Also, for example, the lighting fixture network may be in electrical communication with an external network, such as, for example, the internet or a telephone network, and automatically report a speeding or other incident to the police or other emergency services.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A dynamic street lighting fixture network comprising a plurality of street lighting fixture nodes in network communication with one another, each of the street lighting fixture nodes comprising:
   at least one street lighting fixture having at least one LED light source, a controller in communication with said LED light source, a motion detection system in electrical communication with said controller, a data transmission system in electrical communication with said controller, and a data reception system in electrical communication with said controller;
   said motion detection system of each of said street lighting fixture nodes operable to detect an object within a coverage range and communicate detection of said object to said controller;
   wherein said data transmission system transmits street lighting fixture node identification data when said object is sensed by said motion detection system;
   said data reception system of each of said street lighting fixture nodes operable to receive said street lighting fixture node identification data from other of said street lighting fixture nodes and communicate said street lighting fixture node identification data to said controller;
   wherein during periods of low activity within said street lighting fixture network, the controller of a first street lighting fixture node is operable to dynamically determine a fixed temporal relationship between said first street lighting fixture node and each of the remaining street lighting fixture nodes;
   wherein each said temporal relationship is based on analysis of a plurality of determined time differences between said first street lighting fixture node and a respective one of the remaining street lighting fixture nodes, each of said determined time differences comprising the difference in time between detection of a moving object by the motion detector of the first street lighting fixture node, and receipt by said first street lighting fixture node of street lighting fixture node identification data from the respective one of the remaining street lighting fixtures, wherein the street lighting fixture node identification data is sent in response to detection of the same moving object by the respective one of the remaining street lighting fixtures;
   wherein the determined fixed temporal relationship between said first street lighting fixture node and at least one of the remaining street lighting fixture nodes is adjusted when the controller detects an increase or a decrease in the time difference between the first street lighting fixture node and the at least one of the remaining street lighting fixture nodes.

2. The dynamic street lighting fixture network of claim 1, wherein each said temporal relationship is determined by averaging said plurality of determined time differences.

3. The dynamic street lighting fixture network of claim 2, wherein said controller of each of said street lighting fixture nodes is operable to cause at least one said light source thereof to output at least a first level of light output when said street lighting fixture node identification data received by said data reception system thereof is indicative of at least one of said street lighting fixture nodes having at least a first said temporal relationship.

4. The dynamic street lighting fixture network of claim 3, wherein said controller of each of said street lighting fixture nodes is operable to cause at least one said light source thereof to output a second level of light output greater than said first level of light output when said street lighting fixture node identification data received by said data reception system thereof is indicative of at least one of said street lighting fixture nodes having a second said temporal relationship smaller than said first temporal relationship.

5. The dynamic street lighting fixture network of claim 1, wherein said controller of each of said street lighting fixture nodes is further operable to dynamically determine a spatial relationship to each of a plurality of said street lighting fixture nodes.

6. A control system for at least one lighting fixture, comprising:
   a controller having a light source communication output;
   a motion detector in electrical communication with said controller;
   a data transmitter in electrical communication with said controller; and
   a data receiver in electrical communication with said controller;
   said motion detector operable to detect an object within a lighting fixture coverage range;
   said data receiver operable to receive lighting fixture identification data from at least one of a plurality of lighting fixtures, said lighting fixture identification data indicative of object detection by a specific of said lighting fixtures;
   said controller operable to be initially dynamically calibrated during periods of low activity;
   wherein said controller is calibrated by dynamically determining a fixed temporal relationship to each of a plurality of said lighting fixtures through analysis of a plurality of determined time differences for each of said lighting fixtures, each of said determined time differences comprising the difference in time between detection of a moving object by said motion detector and receipt at said data receiver of lighting fixture identification data from one of said lighting fixtures wherein the lighting fixture identification data is sent in response to detection of the same moving object;
   wherein after said controller is calibrated, said controller is operable to selectively alter an output signal over said light source communication output based only on said temporal relationship to one of said lighting fixtures corresponding to at least one recently received said lighting fixture identification data; and wherein after said controller is calibrated, said controller is recalibrated by updating the determined fixed temporal relationship, said recalibration caused by detection of an increase or a decrease in the time difference between detection of a moving object by said motion detector and receipt at said data receiver of lighting fixture identification data from one of said lighting fixtures.

7. The control system for a lighting fixture of claim 6, wherein before said controller is calibrated, said controller does not selectively alter said output signal.

8. The control system for a lighting fixture of claim 6, wherein said controller is further operable to dynamically determine a spatial relationship to each of a plurality of said lighting fixtures.

9. The control system for a lighting fixture of claim 8, wherein said spatial relationship is determined through analysis of at least one of successor said lighting fixture identification data to object detection by said motion detector and predecessor said lighting fixture identification data to object detection by said motion detector.

10. The control system for a lighting fixture of claim 8, wherein said spatial relationship is determined through analysis of said successor lighting fixture identification data to object detection by said motion detector and said predecessor lighting fixture identification data to object detection by said motion detector.

11. The control system for a lighting fixture of claim 8, wherein said spatial relationship is determined through analysis of differences between said temporal relationship of a plurality of said lighting fixtures.

12. The control system for a lighting fixture of claim 8, wherein said controller is operable to selectively alter said output signal over said light source communication output based on said spatial relationship to at least two of said lighting fixtures corresponding to recently received said lighting fixture identification data.

13. A lighting fixture having a control system for communicating with a plurality of lighting fixtures in a lighting fixture network, comprising:
    at least one light source;
    a controller in electrical communication with said light source;
    a motion detector in electrical communication with said controller;
    a data transmitter in electrical communication with said controller; and
    a data receiver in electrical communication with said controller;
    said motion detector operable to detect an object within a lighting fixture coverage range;
    said data receiver operable to receive lighting fixture identification data from a plurality of lighting fixtures, each said lighting fixture identification data indicative of object detection by a specific of said lighting fixtures;
    wherein said controller is dynamically calibrated by determining a fixed temporal and spatial relationship to each of a plurality of said lighting fixtures through analysis of a plurality of determined time differences for each of said lighting fixtures, each of said determined time differences related to the difference in time between detection of a moving object by said motion detector and receipt at said data receiver of lighting fixture identification data from one of said lighting fixtures, wherein the lighting fixture identification data is sent in response to detection of the same moving object;
    wherein after said controller is calibrated, said controller is operable to ensure said light source produces a first level of light output when a recently received said lighting fixture identification data is indicative of one of said lighting fixtures whose said temporal relationship is within a first time period and when said recently received lighting fixture identification data and at least one lighting fixture identification data preceding said recently received lighting fixture identification data is indicative of a spatial relationship that is decreasing;
    wherein after said controller is calibrated, said controller is recalibrated by updating the determined fixed temporal relationship, said recalibration caused by detection of an increase or a decrease in the time difference between detection of a moving object by said motion detector and receipt at said data receiver of lighting fixture identification data from at least one of said lighting fixtures.

14. The lighting fixture having a control system for communicating with a plurality of lighting fixtures in a lighting fixture network of claim 13, wherein after said controller is calibrated, said controller is operable to ensure said light source produces a second level of light output greater than said first level of light output when said one recently received lighting fixture identification data is indicative of one of said lighting fixtures whose said temporal relationship is within a second time period less than said first time period, and when said recently received lighting fixture identification data and at least one lighting fixture identification data preceding said recently received lighting fixture identification data is indicative of a spatial relationship that is decreasing.

15. The lighting fixture having a control system for communicating with a plurality of lighting fixtures in a lighting fixture network of claim 13, wherein after said controller is calibrated, said controller is operable to decrease said level of light output of said light source when said recently received lighting fixture identification data and at least one lighting fixture identification data preceding said recently received lighting fixture identification data is indicative of a spatial relationship that is increasing.

16. A method of calibrating a lighting fixture within a lighting fixture network, comprising:
    monitoring a lighting fixture network for a period of low activity;
    receiving, at the lighting fixture, lighting fixture identification data from each of a plurality of lighting fixtures within the lighting fixture network during said period of low activity, each of said lighting fixture identification data indicative of detection of a moving object proximal one of a plurality of lighting fixtures;
    detecting, by the lighting fixture, an object within a reference lighting fixture coverage range during said period of low activity;
    determining a plurality of time differences between the lighting fixture and each of the plurality of lighting fixtures within the lighting fixture network, wherein each of said time differences comprises the difference in time between detection of a moving object within said lighting fixture coverage range and receipt of said lighting fixture identification data from a single of said lighting fixtures;
    calculating a fixed temporal relationship between each of said lighting fixtures, said temporal relationship related to a plurality of said determined time differences; and
    adjusting the fixed temporal relationship between at least two of said lighting fixtures when an increase or decrease in the time differences between the at least two of said lighting fixtures is detected.

17. The method of calibrating a lighting fixture within a lighting fixture network of claim 16, further comprising the step of determining a spatial relationship between each of a plurality of said lighting fixtures.

18. The method of calibrating a lighting fixture within a lighting fixture network of claim 17, wherein said spatial relationship is determined through analysis of at least one of successor said lighting fixture identification data received after object detection within said lighting fixture coverage range and predecessor said lighting fixture identification data received prior to object detection within said lighting fixture coverage range.

19. The method of calibrating a lighting fixture within a lighting fixture network of claim 17, wherein said spatial relationship is determined through analysis of said successor lighting fixture identification data received after object detection within said lighting fixture coverage range and said predecessor lighting fixture identification data received prior to object detection within said lighting fixture coverage range.

20. A method of controlling a lighting fixture within a lighting fixture network comprising a plurality of lighting fixtures, the method comprising the steps of:

monitoring a lighting fixture network for a period of low activity;

receiving lighting fixture identification data from each of a plurality of lighting fixtures within the lighting fixture network during said period of low activity, each of said lighting fixture identification data indicative of detection of a moving object proximal a respective one of the plurality of lighting fixtures;

detecting an object within a reference lighting fixture coverage range during said period of low activity;

determining a plurality of time differences for each of said lighting fixtures, wherein each of said calculated time differences comprises the difference in time between detection of a moving object within said reference lighting fixture coverage range and receipt of said lighting fixture identification data;

calculating a fixed temporal relationship between each of said lighting fixtures, said temporal relationship related to a plurality of said determined time differences;

causing at least one light source proximal said reference lighting fixture coverage range to be powered with power having predetermined characteristics, wherein said predetermined characteristics are dependent on said temporal relationship of a lighting fixture corresponding to a recently received said lighting fixture identification data;

detecting an increase or decrease in a plurality of determined time differences between the at least two of said lighting fixtures; and calculating, when said increase or decrease is detected, an updated fixed temporal relationship between the at least two of said lighting fixtures.

* * * * *